UNITED STATES PATENT OFFICE.

CHARLES M. SPOONER, OF NEW BEDFORD, MASS., ASSIGNOR TO THE NEW ENGLAND GUTTA PERCHA ROOFING COMPANY, OF SAME PLACE.

IMPROVED COMPOSITION FOR STOVE-POLISH.

Specification forming part of Letters Patent No. 42,026, dated March 22, 1864.

*To all whom it may concern:*

Be it known that I, CHARLES M. SPOONER, a resident of New Bedford, in the county of Bristol and State of Massachusetts, have invented a new and useful or Improved Composition to be used in Polishing a Stove or Various other Metallic Surfaces; and I do hereby declare the same to be fully described as follows.

In carrying out the invention the constituents to be employed, with their relative proportions, may be stated as follows, viz: twenty-five pounds of plumbago, five pounds of common yellow soap, one-half a gallon or four pounds of " candle-pitch," one-half a gallon of water, and two ounces of litharge. The material termed " candle-pitch" is well known in the market, it being an artificial bitumen.

When in the process of decomposing oil sulphuric acid is used it will act on the glycerine, and the candle-pitch will be formed, which, when the oil is distilled, remains in a semi-solid state, and is an artificial product analogous to natural bitumen.

In combining the constituents of the composition first put into a kettle the litharge and candle-pitch, and melt the latter and raise its temperature to about 450° Fahrenheit, this being necessary in order to combine the litharge with the candle-pitch. Next melt the soap with the water in another kettle, and by heat applied to the latter, and afterward pour the solution of soap and the combined litharge and candle-pitch into another vessel, and stir into the mixture the plumbago, so as to thoroughly incorporate the whole together, after which the mass should be allowed to become cool to ordinary atmospheric temperature.

The plumbago is the base of the compound. The object of the soap is to produce a chemical union between the water and other parts of the composition. The candle-pitch operates to preserve the plumbago or prevent it from flying or peeling off a stove or body when applied thereto, and, besides, the candle-pitch is useful in other respects. The litharge serves as a drier, and unless used in the composition the compound would be liable to remain in a tacky state.

I claim as my invention—

The composition or stove-polish made of the ingredients and in manner substantially as hereinbefore specified.

CHAS. M. SPOONER.

Witnesses:
R. H. EDDY,
F. P. HALE, Jr.